United States Patent [19]

Butterfield et al.

[11] Patent Number: 5,092,545
[45] Date of Patent: Mar. 3, 1992

[54] METHOD OF DELIVERING LUNAR GENERATED FLUID TO EARTH ORBIT USING AN EXTERNAL TANK

[75] Inventors: Ansel J. Butterfield; John W. Goslee, both of Newport News, Va.

[73] Assignee: The United States of America as represented by the Administrator of the National Aeronautics and Space Administration, Washington, D.C.

[21] Appl. No.: 520,883

[22] Filed: May 9, 1990

[51] Int. Cl.$^5$ .............................................. B64G 1/10
[52] U.S. Cl. ................................ 244/158 R; 244/159
[58] Field of Search ................ 244/2, 63, 158 R, 163, 244/172

[56] References Cited

U.S. PATENT DOCUMENTS

| | | |
|---|---|---|
| 3,866,863 | 2/1975 | von Pragenau . |
| 4,132,373 | 1/1979 | Lang . |
| 4,775,120 | 10/1988 | Warwick .............................. 244/63 |
| 4,807,833 | 2/1989 | Pori . |
| 4,834,324 | 5/1989 | Criswell .................................. 244/2 |

OTHER PUBLICATIONS

Lunar Science Institute, Criswell, copyright 1976.
Vinopal, "Aeroassisted Orbital Transfer Vehicle Sys Tech Study", D180-29222-1 Boeing 1985.

Primary Examiner—Galen Barefoot
Attorney, Agent, or Firm—Larson & Taylor

[57] ABSTRACT

A method and apparatus are provided for delivering lunar generated fluid to Earth orbit from lunar orbit. Transport takes place in an external tank of a shuttle which has been suitably outfitted in Earth orbit for reusable travel between Earth orbit and a lunar orbit. The outfitting of the external tank includes the adding of an engine, an electrical system, a communication system, a guidance system, an aerobraking device, and a plurality of interconnected fluid storage tanks to the hydrogen and oxygen tanks of the external tank. The external tank is then propelled to lunar orbit the first time using Earth-based propellant. In lunar orbit, the storage tanks are filled with the lunar generated fluid with the remainder tank volumes filled with lunar generated liquid oxygen and hydrogen which serve as propellants for returning the tank to Earth orbit where the fluid is off-loaded. The remaining lunar generated oxygen and hydrogen is then sufficient to return the external tank to lunar orbit so that a subsequent cycle of fluid delivery is repeated. A space station in a higher Earth orbit is preferably used to outfit the external tank, and a lunar node in lunar orbit is used to store and transfer the fluid and liquid oxygen and hydrogen to the external tank. The lunar generated fluid is preferably $^3$He.

20 Claims, 4 Drawing Sheets

5,092,545

METHOD OF DELIVERING LUNAR GENERATED FLUID TO EARTH ORBIT USING AN EXTERNAL TANK

The invention described herein was made in the performance of work under NASA Contract No. NAS1-18267 and is subject to the provisions of Section 305 of the National Aeronautics and Space Act of 1958, as amended (42 USC 2457).

FIELD OF THE INVENTION

The present invention relates generally to the transport of lunar generated fluid from lunar orbit to Earth orbit, and more particularly to modifications of an external tank in order to serve as a lunar transport for a lunar generated fluid such as $^3$He.

BACKGROUND OF THE INVENTION

The National Space Transportation System external tank is a sacrificial structure used for approximately eight and one-half minutes during each space launch. This external tank provides liquid oxygen and liquid hydrogen to the orbiter's main engines. The external tank is designed to carry sufficient propellant to place the external tank (attached to the orbiter) into low Earth orbit. Currently, the external tanks are jettisoned just prior to low Earth orbit insertion, and subsequently tumble and break up in the atmosphere before falling over open seas. The external tank consists of two pressure vessels, an oxygen tank and a hydrogen tank, joined by a cylindrical intertank structure.

In U.S. Pat. No. 4,807,833 (Pori), the configuring of a space vehicle fuel cell in order to provide modular structural building components for a space station is disclosed. The configuring of the fuel cell includes the modifying of existing intertank structure to provide two concentric fuel storage tanks.

Other patents of general interest include: U.S. Pat. No. 3,866,863 (Von Pragenau) which discloses a space vehicle using an external fuel cell; and U.S. Pat. No. 4,132,373 (Lang) which discloses a manned space flight body comprising a cylindrical shell.

It should also be appreciated that a nuclear fusion reaction applicable to electrical power generation includes the helium isotope of mass number three combining with deuterium (D) to yield a proton and a helium nucleus of mass four. The recoil energy from the charged particles can generate electrical power by direct conversion through an interaction with a magnetic field. In addition, the absorption of the recoil energy does not require the nuclear transmutations associated with fusion reactions that produce neutrons. The $^3$He reaction has been observed and characterized within present controlled fusion research, and the advantages associated with the charged particles appear to offset the higher input energies associated with containment and initiation.

Projections for fusion technology advances indicate that the D—$^3$He reaction could become a viable power system alternative coincident with the establishment of a permanent lunar base so that lunar sources would be available to supply Earth requirements. In particular, although the quantities of $^3$He available on Earth could not support a large scale generation of electrical power with this reaction, data from lunar samples indicate the presence of $^3$He in recoverable quantities sufficient to supply fusion powered generation of electricity. In addition, the gaseous by-product from the $^3$He extraction provide hydrogen and oxygen in a quantity to provide a transport propellant.

The transport of $^3$He encounters practical difficulties of low specific mass combined with the lowest liquification temperature (3.20K, 5.76 R) of any isotope. At standard atmospheric pressure, $^3$He remains a liquid at absolute zero.

It appears that the delivery of $^3$He to Earth at rates above 1,000 kg/month (2205 lb/month) would have a significant economic benefit. Preliminary comparisons of fuel costs relative to other sources show an economic advantage if $^3$He can be delivered to the Earth for a billion dollars per metric ton. Deliveries of about five metric tons per month would probably provide two times the electrical needs of the United States.

SUMMARY OF THE INVENTION

In accordance with the present invention, a lunar transport method and apparatus are disclosed for delivering lunar generated fluid such as $^3$He to Earth orbit from lunar orbit. This is accomplished by initially boosting an external tank of a shuttle into low Earth orbit. This external tank is then outfitted in Earth orbit for travel between Earth orbit and lunar orbit. This outfitting includes: the attaching of an $H_2$—$O_2$ burning engine to the external tank; adding auxiliary systems to the external tank including an electrical system, a communications system, and a guidance system; adding an aerobraking means to the external tank for decelerating the external tank when rendezvousing in Earth orbit; and adding a plurality of interconnected fluid storage tanks in the oxygen tank and in the hydrogen tank of the external tank while leaving a remainder tank volume in the oxygen tank and hydrogen tank. The external tank is then propelled to lunar orbit using the attached engine. In lunar orbit, the storage tanks are filled with the lunar generated fluid. In addition, the remainder tank volumes of the oxygen and hydrogen tanks are filled with lunar generated liquid oxygen and hydrogen so that these fluids are in cryogenic equilibrium with the lunar generated fluid. The external tank is then propelled back to Earth orbit using the attached engine and lunar generated fuel. In Earth orbit, the fluid is off loaded from the external tank and thereafter the external tank is propelled back to lunar orbit using the attached engine and lunar generated fuel for a subsequent cycle of fluid delivery.

Preferably, the external tank is moved from low Earth orbit to a space station provided in high Earth orbit before outfitting of the external tank takes place.

In adding the storage tanks to the oxygen and hydrogen tanks, the storage tanks are preferably passed through respective access manholes of the oxygen and hydrogen tanks. Then, a new cover is provided for the respective access manhole of the oxygen and hydrogen tanks through which a fluid filling connection line for the storage tanks therein extends. In this preferred embodiment, storage tank supports are initially passed through the access manholes and attached to existing internal structures of the oxygen or hydrogen tanks so that the supports then serve to stabilize the storage tanks.

In outfitting the external tank, the existing external tank propellant feed lines are connected to the attached engine. Further, an attitude control system including auxiliary thrusters is attached to the external tank to control the attitude of the external tank during aerobraking.

In the preferred embodiment, fuel cells are preferably provided as part of the electrical system. These fuel cells are connected to the propellant lines of the attached engine in order to provide fuel for the fuel cells. The electrical system, communications system, and guidance system are all preferably provided in the intertank of the external tank.

It is anticipated that the storage tanks will fill approximately one half of the volume of the oxygen and hydrogen tanks. Then, surplus quantities of the generated liquid oxygen and liquid hydrogen are removed from the respective oxygen and hydrogen tanks during Earth orbit. The surplus quantities of lunar generated liquid oxygen and hydrogen are then used as a thermal blanket for the off-loaded fluid.

The lunar generated fluid is initially transported into lunar orbit using a double-wall transfer tank. The fluid is provided in an inner volume thereof, while the outer volume is filled with either of the lunar generated liquid oxygen or hydrogen. A transfer node in lunar orbit is then used to hold a plurality of these transfer tanks. The external tank is then docked to this transfer node, and the lunar generated fluid, oxygen, and hydrogen transferred from the transfer tanks to the external tank.

A reusable lunar ascent-descent transporter is conveniently provided by the present invention for delivering lunar generated fluid such as $^3$He to low lunar orbit.

It is an advantage of the present invention that any gaseous or fluid product of value which would benefit from transportation at cryogenic temperatures associated with liquid hydrogen (22K) or liquid oxygen (91K) can be economically transported from lunar orbit. In particular, a gas such as $^3$He can be transported in cryogenic equilibrium at modest pressures. Otherwise, such $^3$He would require liquification of a most difficult gas or transportation at high pressure in heavy containers. It should also be appreciated that the transport of $^3$He at cryogenic temperatures reduces the loss of this material since $^3$He diffuses through container materials when stored at ordinary temperatures.

It is also an advantage of the present invention that transport operations utilize lunar derived propellants for all phases of the flight. In particular, the volumes available allow a round trip from lunar orbit without need for a near Earth based refill.

It is a further advantage of the present invention that the lunar transporter is a modified existing unit using existing or known components.

Still another advantage of the present invention is that the transportation concept does not require liquification of the cargo gas, in particular $^3$He, and that the gas transported in cryogenic equilibrium with the liquid hydrogen or oxygen will have no boil off loss.

Yet another advantage of the present invention, is that the lunar transporter will handle commercially useful quantities, up to five metric tons of $^3$He per flight.

Other features and advantages of the present invention are stated in or apparent from a detailed description of a presently preferred embodiment of the invention found hereinbelow.

DETAILED DESCRIPTION OF THE PREFERRED EMBODIMENT

Figure 1:
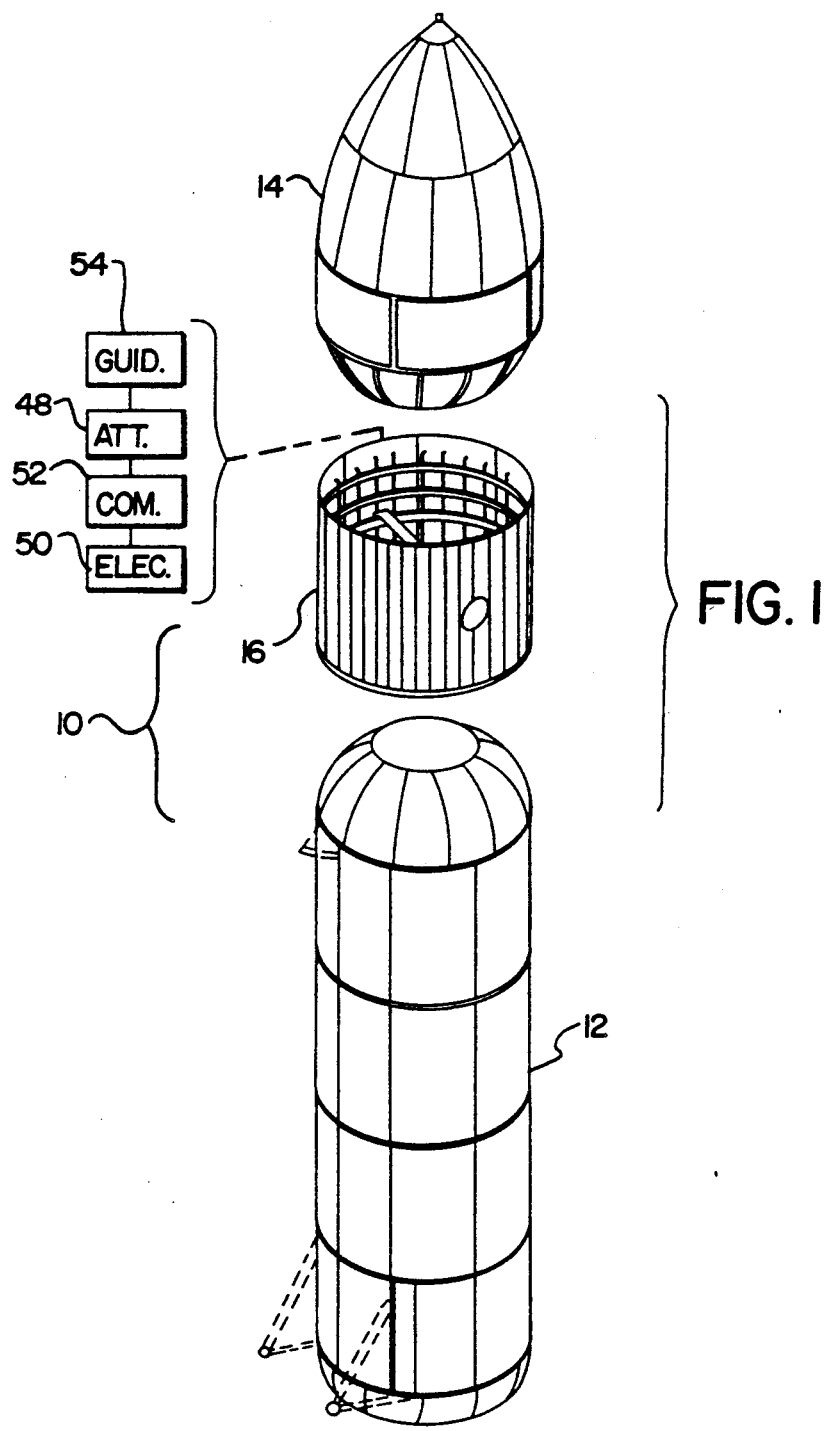
FIG. 1 is a schematic exploded elevation perspective view of an external tank.
Figure 3:
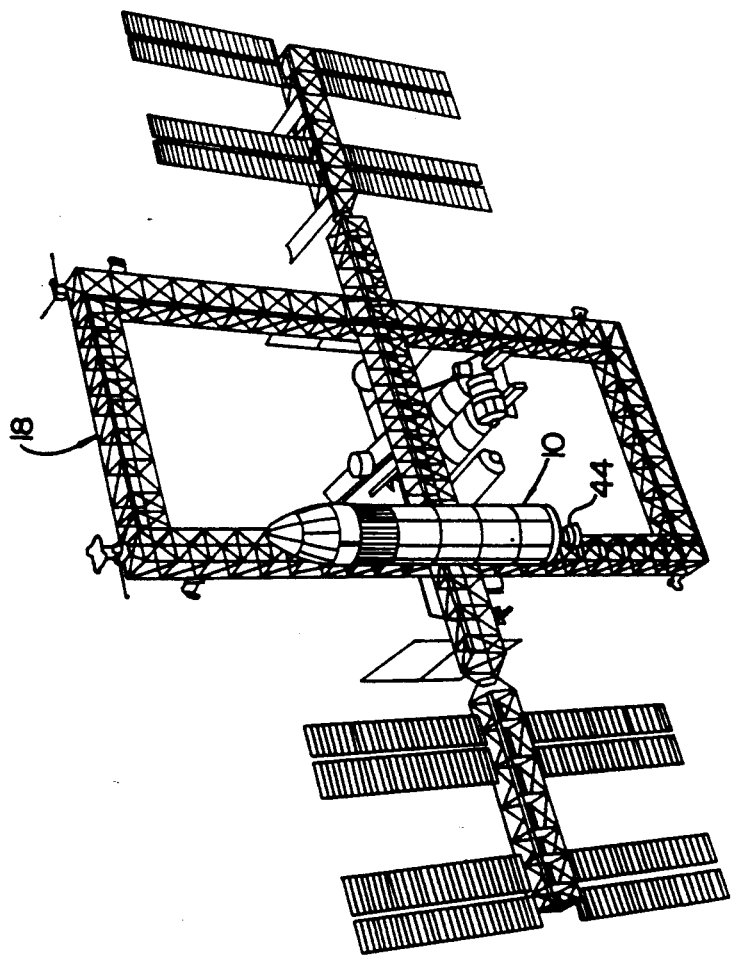
FIG. 3 is a schematic perspective view of the external tank attached to a space station for outfitting.
Figure 2:
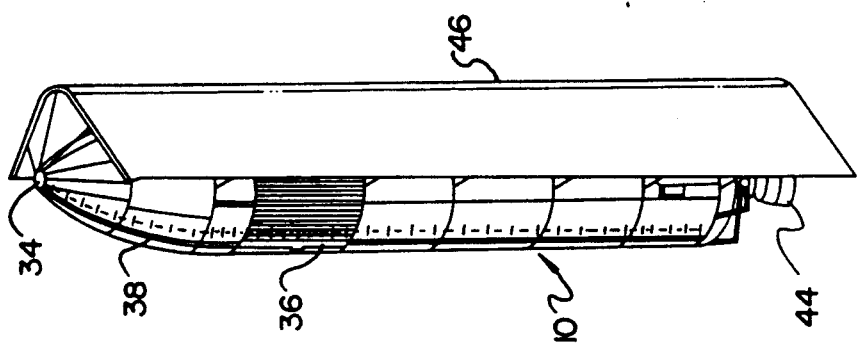
FIG. 2 is an elevation perspective view of an external tank which has been outfitted in accordance with the present invention.
Figure 6:
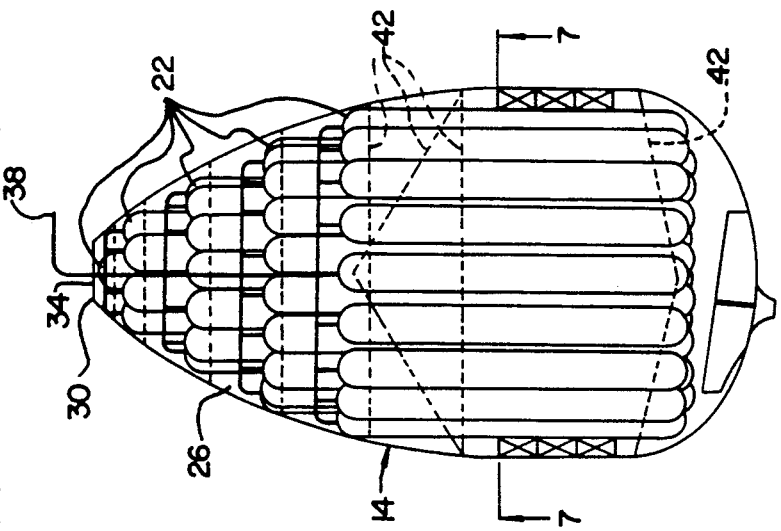
FIG. 6 is a schematic cross-sectional elevation view of an outfitted oxygen tank.
Figure 4:
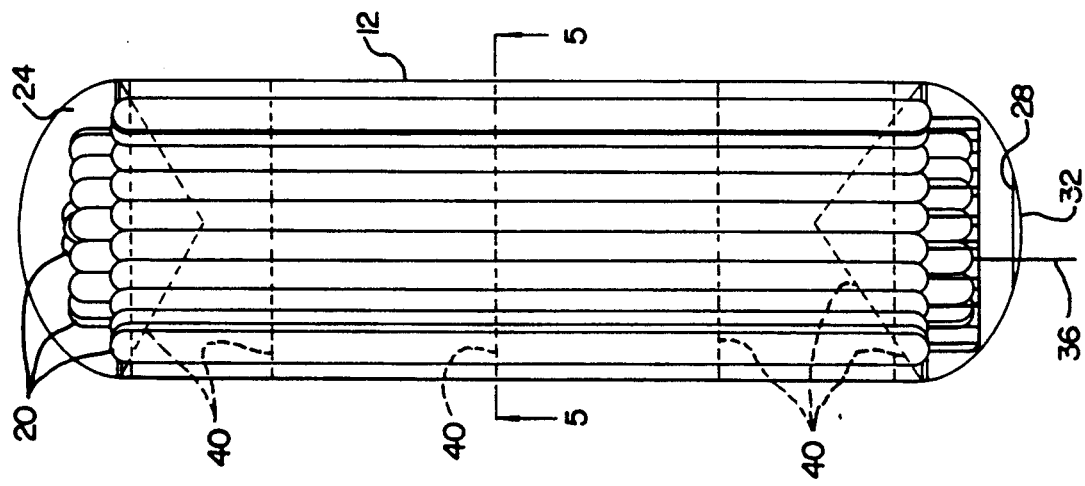
FIG. 4 is a schematic cross-sectional elevation view of an outfitted hydrogen tank.

With reference now to the drawings in which like numerals represent like elements throughout the several views, a shuttle external tank 10 as shown in FIG. 1 is transported into Earth orbit where outfitting of external tank 10 takes place. External tank 10 consists of a hydrogen tank 12, an oxygen tank 14, and a cylindrical intertank 16. After being placed in a low Earth orbit in conjunction with the launching of an orbiter or the like, external tank 10 is preferably stabilized in orbit by use of an orbital maneuvering vehicle which moves external tank 10 to a space station 18 located in a higher Earth orbit.

One of the principal modifications to external tank 10 occurring at space station 18 is the installation of cylindrical storage tanks 20 in hydrogen tank 12 and cylindrical storage tanks 22 in oxygen tank 14 as shown in FIGS. 4-7. The arrangement of tanks 20 and 22 are shown in the drawings, and this arrangement fills approximately half of the internal volume of hydrogen tank 12 and oxygen tank 14, leaving a remainder volume 24 in hydrogen tank 12 and a remainder volume 26 in oxygen tank 14. The external diameters of tanks 20 and 22 are preferably about 89 cm (35 inches) so that tanks 20 and 22 pass through the existing access manholes 28 and 30 of respective hydrogen tank 12 and oxygen tank 14. A remote handling fixture specifically designed for this purpose is preferably provided on space station 18.

At completion of the installation, new covers 32 and 34 will be provided for respective access manholes 28 and 30, with each cover including a penetration for a $^3$He servicing line 36 or 38, respectively. Servicing lines 36 and 38 each extend to a central point at intertank 16. Preferably, an internal support structure 40 and 42, respectively, are used to support tanks 20 and 22. Internal support structures 40 and 42 consist of port-compatible segments which attach to elements of existing structure within hydrogen tank 12 and oxygen tank 14, respectively. External tank 10 intended for use with the present invention would thus preferably be provided with such existing structure in advance and some internal mounting provisions would thus be incorporated during assembly. Internal structures 40 and 42 stabilize storage tanks 20 and 22 during accelerations as well as for both thrust and buoyancy forces that vary with the amount of propellant within oxygen tanks 12 and 14 (as discussed subsequently).

Another modification required for external tank 10 is the installation of a shuttle main engine 44 or the like. Engine 44 is thus an $H_2$—$O_2$ engine, such as an uprated shuttle main engine. Engine 44, together with the necessary lines, controls, and auxiliaries is preferably preassembled into a module for installation at space station 18. This module is designed to mate with the existing propellant feed lines from hydrogen tank 12 and oxygen tank 14, and to have additional servicing lines necessary for propellant transfer. It should be appreciated that engine 44 will be required to be capable of multiple restarts.

External tank 10 is also outfitted with an aerobraking means such as aerobrake heat shield 46. Aerobrake heat shield 46 is required to decelerate external tank 10 when rendezvousing in a low Earth orbit upon a return from lunar orbit. Various aerobraking means are possible, including inflatables, rigid aeroshells, and transpiration-cooled lifting entry configurations. Aerobrake heat shield 46 employs a two dimensional bluff body shield. The braking sequence would benefit from a low deceleration and a low thermal flux. An active attitude control system 48 is also required during the aerobraking, and auxiliary thrusters would thus be incorporated as part of this system. As shown, attitude control system 48 is located in intertank 16.

Besides attitude control system 48, additional subsystems would also be required. Such subsystems include an electrical power system 50, a communications system 52, and a guidance system 54. Systems 50, 52, 54, are also fitted into intertank 16 as indicated in FIG. 1. Electrical power system 50 would in particular include fuel cells (not shown) to provide electrical power to the other systems. Such fuel cells would draw from the $H_2$—$O_2$ propellant lines. Antennas for communication system 52 would also require an external mounting as appropriate. Communication at frequencies above 36 GHz (K band) may be required to avoid interference with Earth-to-orbit transmissions.

To be used as a transporter, external tank 10 would also require a different thermal insulation from normal external tanks as well as some additional protection from micrometeriods. These considerations would preferably be taken care of in the initial definition of external tank 10 and modifications incorporated during the assembly sequence as required.

System mass estimates coupled with the anticipated performance for propulsion systems show that a round-trip capability is possible from lunar orbit. Tank considerations assume about half of the internal volume of hydrogen tank 12 (volume equal to 1,512 m$^3$ or 53,500 ft$^3$) is devoted to the cylindrical storage tanks 20 so that the mass for liquid hydrogen will be at about (116,644 lb). Similarly, half the internal volume of oxygen tank 14 (552 m$^3$ or 19,500 ft$^3$) is devoted to the cylindrical storage tanks so that the mass for liquid oxygen will be at (697,000 lb). The masses for the fuel are thus about half the loaded mass for launch from Earth. This evaluation also assumes that remainder volumes 24 and 26 are full at departure from lunar orbit.

It should be appreciated that about half of the tank volumes of hydrogen tank 12 and oxygen tank 14 thus provide accommodations for $^3$He, with the $^3$He in cryogenic equilibrium with liquid hydrogen and oxygen contained in remainder volumes 24 and 26, respectively. The values for $^3$He gas density show the effects of temperature reduction as compared to standard condition values of 0.133 kg/m$^3$ (0.0083 lb/ft$^3$). At a standard atmospheric pressure and cryogenic equilibrium, cylindrical storage tanks 20 and 22 would hold about 1,355 kg (2,988 lb) of $^3$He. However, a modest pressure increase allows transport of 5,000 kg (11,025 lb). Thus, during transport, it is expected that the actual pressure differential will be less than about 3 atmospheres.

Estimates of propellant usage and velocity changes assume external tank 10 will not have the constraints applied to Apollo trajectories. The value for specific impulse assumes a fully developed $O_2$—$H_2$ engine capable of achieving 4707 N-sec/kg (480 sec.) in vacuum operation. The burn to leave lunar orbit would absorb the full thrust of a present shuttle main engine 44 without exceeding an acceleration of 0.5 g. All of the subsequent burns would operate with some degree of throttling and the 0.5 g limit is considered practical for an assembly of this size. The critical portion for $^3$He transport extends from lunar orbit departure to rendezvous at a low Earth orbit. The propellant usage consumes about 25% of the total, and this reduction in volume does not appear to compromise the temperature equilibrium within the tanks so that cylindrical storage tanks 20 and 22 remain essentially submerged.

The transit back to lunar orbit for refill benefits from a minimum residual propellant. Thus, surplus propellant would be off-loaded in Earth orbit. The off-loaded propellant would thus continue as a thermal blanket and possibly provide transit propellant to Earth. This estimate also retains a modest residual of 10,000 kg (22,050 lb) at lunar orbit for external tank 10 to keep the internal temperatures of cylindrical storage tanks 20 and 22 near cryogenic equilibrium. The off-loaded surplus of propellants at low Earth orbit would amount to about 69,000 kg (152,145 lb), less that required by flow into the fuel cells and any requirements for attitude control thrusting during aerobraking. In any event, this off-loaded propellant will provide a quantity of cryogenics for other uses at Earth orbit as desired.

Figure 9:
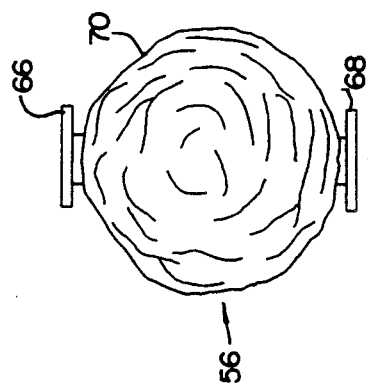
FIG. 9 is an elevation view of a lunar transfer tank.
Figure 10:
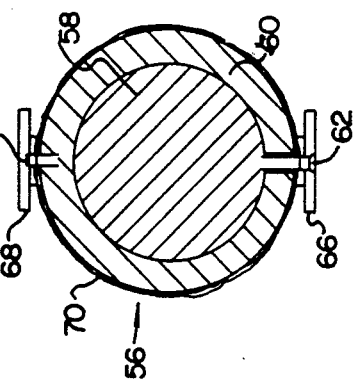
FIG. 10 is a cross-sectional view of the lunar transfer tank depicted in FIG. 9.

The transport of the $^3$He from the lunar surface to lunar orbit will utilize the same concept of a cryogenic blanket around a $^3$He container. Depicted in FIGS. 9 and 10 is a suitable transfer tank 56. Transfer tank 56 is a double-sphere defining an inner volume 58 in which the $^3$He is contained and an outer volume 60 in which liquid hydrogen or oxygen is provided. A $^3$He connector 62 and a cryogen connector 64 are provided for respective volumes 58 and 60. Connectors 62 and 64 are located in respective handling and mounting adapters 66 and 68. Surrounding transfer tank 56 is space rated insulation 70.

Figure 8:
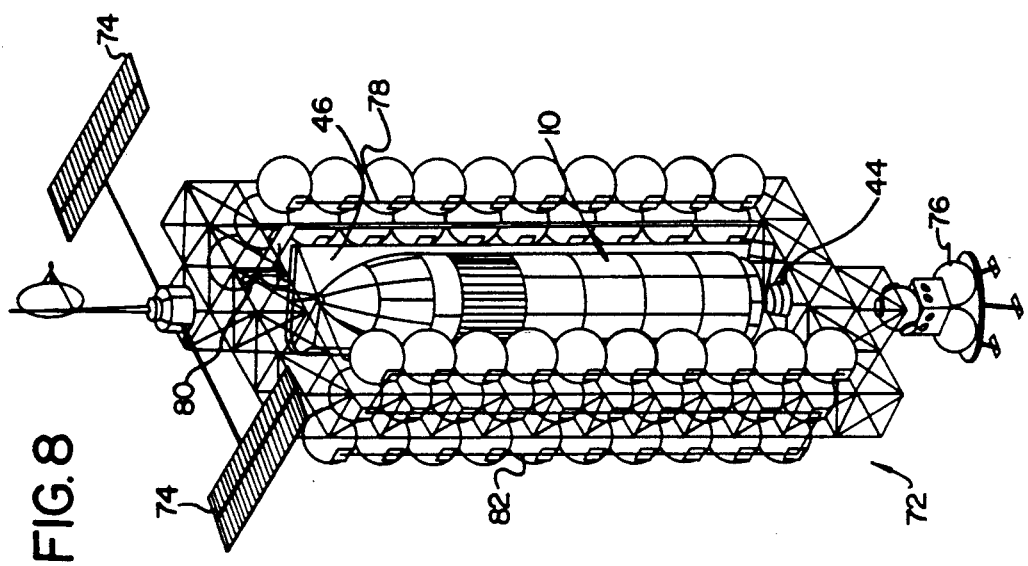
FIG. 8 is a schematic perspective side view of the outfitted external tank docked at a lunar node.
Figure 5:
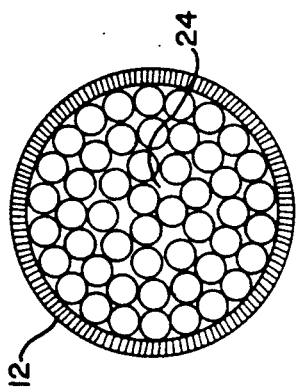
FIG. 5 is a cross-sectional view of the hydrogen tank taken along the line 5—5 in FIG. 4.
Figure 7:
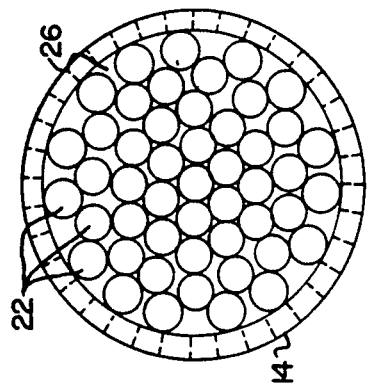
FIG. 7 is a cross-sectional view of the oxygen tank taken along line 7—7 in FIG. 6.

Approximately twenty transfer tanks 56 would be utilized for oxygen-helium transfer (inner volume diameter 2.98 m, outer volume diameter 3.74 m) while approximately forty transfer tanks 56 would be used for hydrogen-helium transfer (inner volume diameter 3.30 m, outer volume diameter 4.16 m). A transfer node 72 in lunar orbit as shown in FIG. 8 would be utilized. Transfer node 72 is conveniently made from erectable bays from the space station, and provides a mounting structure that holds sixty transfer tanks 56.

As shown in FIG. 8, external tank 10 would dock to transfer node 72 for transfer operations in lunar orbit. Transfer node 72 would include solar power cells 74 and be capable of performing all of the servicing functions from remote control although it could also be man-tended. Transfer node 72 includes a man-tending lunar lander 76, and manifolds 78 and 80 for connection to outer volumes 60 for oxygen and hydrogen, respectively, as well as a manifold 82 for connection to inner volume 58 of transfer tanks 56 for $^3$He transfer. Transfer node 72 also includes various manipulators and robotic equipment to move transfer tanks 56 from a lunar ascent-decent vehicle. The lunar ascent-descent vehicle will be used to exchange three tanks during each of twenty supply flights between transfer node 72 and the lunar surface. Transfer node 72 would also be equipped to service external tank 10 as required.

Thus, the present invention addresses the transport of gaseous $^3$He in temperature equilibrium with liquid hydrogen and oxygen in a modified shuttle external tank 10. Outfitted shuttle external tank 10 then operates as an unmanned $^3$He tanker which has the capability of transporting about 5,000 kg (11,025 lb) for each round trip between lunar orbit and Earth orbit. In addition, external tank 10 can make a round trip using $O_2$—$H_2$ propellants, and by-products of $^3$He extraction produce $O_2$ and $H_2$ in quantities that exceed the propellants requirements. The internal modifications of external tank 10 consist of small diameter cylindrical storage tanks 20 and 22 that occupy about half of the internal volume of hydrogen tanks 12 and 14. Other modifications include the mounting of shuttle main engine 44, the addition of an aero-shell or heat shield 46 for breaking into low Earth orbit, and the auxiliary systems required for an unmanned transport. Estimates of propulsion requirements show the capability for a round trip from lunar orbit to Earth orbit using only lunar-supplied propellants, after an initial trip to the moon using Earth supplied propellants.

Additional details of a proposed system are disclosed in "Concept for a Lunar $^3$He Transporter Using an In Orbit Modified Shuttle External Tank" by A. J. Butterfield et al which was presented at the 9th Biennial Princeton Conference on space manufacturing held in Princeton, N.J. on May 10-13, 1989. This paper is herein incorporated by reference.

While the present invention has been described with respect to an exemplary embodiment thereof, it will be understood by those of ordinary skill in the art that variations and modifications can be effected within the scope and spirit of the invention.

We claim:

1. A method of delivering lunar generated fluid to Earth orbit from lunar orbit comprising the steps of:
   boosting an external tank of a shuttle into low Earth orbit;
   outfitting the external tank in Earth orbit for reusable travel between Earth orbit and a lunar orbit, said outfitting step including
   attaching an $H_2$—$O_2$ burning engine to the external tank,
   adding auxiliary systems to the external tank including an electrical system, a communications system, and a guidance system,
   adding an aerobraking means to the external tank for decelerating the external tank when rendezvousing in Earth orbit, and
   adding a plurality of interconnected fluid storage tanks in an oxygen tank and a hydrogen tank of the external tank while leaving a remainder tank volume in the oxygen tank and hydrogen tank;
   propelling the external tank to lunar orbit using the attached engine;
   filling the storage tanks with the lunar generated fluid and filling the remainder tank volumes of the oxygen and hydrogen tanks respectively with lunar generated liquid oxygen and hydrogen while the external tank is in lunar orbit such that the fluid is in cryogenic equilibrium with the liquid oxygen or hydrogen;
   propelling the external tank back to Earth orbit using the attached engine and lunar generated fuel;
   off-loading the fluid from the external tank in Earth orbit; and
   propelling the external tank back to lunar orbit using the attached engine and lunar generated fuel for a subsequent cycle of fluid delivery.

2. A method of delivering fluid as claimed in claim 1 and further including the step of moving the external tank from low Earth orbit to a space station provided in a high Earth orbit before the outfitting step.

3. A method of delivering fluid as claimed in claim 1 wherein the adding of the storage tanks step includes the step of passing the storage tanks through respective access manholes provided in the oxygen and hydrogen tanks.

4. A method of delivering fluid as claimed in claim 3 and further including the step of providing a new cover for the access manhole of the oxygen tank through which a fluid filling connection line for the storage tanks therein extends.

5. A method of delivering fluid as claimed in claim 4 and further including the step of providing a new cover for the access manhole of the hydrogen tank through which a fluid filling connection line for the storage tanks therein extends.

6. A method of delivering fluid as claimed in claim 5 wherein the outfitting step further includes the steps of passing storage tank supports through the access manholes of the oxygen and hydrogen tanks and attaching the supports to existing internal structures of the oxygen and hydrogen tanks so that the supports stabilize the storage tanks.

7. A method of delivering fluid as claimed in claim 1 wherein said outfitting step includes the step of connecting existing external tank propellant feed lines to the attached engine.

8. A method of delivering fluid as claimed in claim 1 wherein said outfitting step further includes the step of adding an attitude control system including auxiliary thrusters attached to the external tank to control the attitude of the external tank during aerobraking.

9. A method of delivering fluid as claimed in claim 1 wherein the electrical system includes fuel cells, and wherein the outfitting step includes the connecting of the fuel cells to propellant lines of the attached engine in order to provide fuel to the fuel cells.

10. A method of delivering fluid as claimed in claim 1 wherein the outfitting step includes the installation of the electrical system, communications system, and guidance system in an intertank of the external tank.

11. A method of delivering fluid as claimed in claim 1 wherein said outfitting step fills approximately one-half of the volume of the oxygen and hydrogen tanks with storage tanks in the adding step.

12. A method of delivering fluid as claimed in claim 1 wherein the off-loading step includes the step of off-loading surplus quantities of the lunar generated liquid oxygen and liquid hydrogen from the respective oxygen and hydrogen tanks.

13. A method of delivering fluid as claimed in claim 12 and further including the step of using the surplus quantities of the lunar generated oxygen and hydrogen as a thermal blanket for the off-loaded fluid.

14. A method of delivering fluid as claimed in claim 1 and further including the step of transporting the lunar generated fluid from the lunar surface to lunar orbit in a double-walled transfer tank with the fluid in an inner volume thereof and surrounded by one of the lunar generated liquid oxygen or hydrogen in an outer volume thereof.

15. A method of delivering fluid as claimed in claim 14 and further including the steps of providing a transfer node in lunar orbit, holding a plurality of the transfer tanks at the transfer node, docking the external tank to the transfer node, and transferring of the lunar generated fluid, oxygen and hydrogen from the transfer tanks to the external tank at the transfer node.

16. A method of delivering fluid as claimed in claim 15 wherein the lunar generated fluid is $^3$He.

17. A method of delivering lunar generated $^3$He to Earth orbit from lunar orbit comprising the steps of:
   boosting an external tank of a shuttle into low Earth orbit;
   outfitting the external tank in Earth orbit for reusable travel between Earth orbit and a lunar orbit, said outfitting step including
      attaching an $H_2$—$O_2$ burning engine to the external tank,
      adding auxiliary systems to an intertank of the external tank including an electrical system, a communications system, and a guidance system,
      adding an aerobraking means to the external tank for decelerating the external tank when rendezvousing in Earth orbit, and
      adding a plurality of interconnected $^3$He storage tanks in an oxygen tank and a hydrogen tank of the external tank while leaving a remainder tank volume in the oxygen tank and hydrogen tank;
   propelling the external tank to lunar orbit using the attached engine;
   filling the storage tanks with the lunar generated $^3$He and filling the remainder tank volumes of the oxygen and hydrogen tanks respectively with lunar generated liquid oxygen and hydrogen while the external tank is in lunar orbit such that the $^3$He is in cryogenic equilibrium with the liquid oxygen or hydrogen;
   propelling the external tank back to Earth orbit using the attached engine and lunar generated fuel;
   off-loading from the external tank in Earth orbit the $^3$He and surplus quantities of the liquid oxygen and hydrogen beyond that needed to return the external tank to lunar orbit; and
   propelling the external tank back to lunar orbit using the attached engine and lunar generated fuel for a subsequent cycle of $^3$He delivery.

18. A method of delivering $^3$He as claimed in claim 17 and further including the step of using the surplus quantities of the lunar generated oxygen and hydrogen as a thermal blanket for the off-loaded fluid.

19. A method of delivering $^3$He as claimed in claim 18 and further including the step of transporting the lunar generated $^3$He from the lunar surface to lunar orbit in a double-walled transfer tank with the $^3$He in an inner volume thereof and surrounded by one of the lunar generated liquid oxygen or hydrogen in an outer volume thereof.

20. A method of delivering $^3$He as claimed in claim 19 and further including the steps of providing a transfer node in lunar orbit, holding a plurality of the transfer tanks at the transfer node, docking the external tank to the transfer node, and transferring of the lunar generated $^3$He, oxygen and hydrogen from the transfer tanks to the external tank at the transfer node.

* * * * *